(12) United States Patent
Schutte

(10) Patent No.: US 7,552,347 B2
(45) Date of Patent: Jun. 23, 2009

(54) ADAPTIVE POWER MANAGEMENT OF A DISK DRIVE BASED ON USER ACTIVITY

(75) Inventor: Mark Edward Schutte, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 465 days.

(21) Appl. No.: 11/451,804

(22) Filed: Jun. 13, 2006

(65) Prior Publication Data

US 2007/0288777 A1   Dec. 13, 2007

(51) Int. Cl.
  *G06F 1/26*   (2006.01)
(52) U.S. Cl. ................... 713/300; 713/320; 713/323
(58) Field of Classification Search ............... 713/300
See application file for complete search history.

(56) References Cited

U.S. PATENT DOCUMENTS

| | | | |
|---|---|---|---|
| 5,452,277 A | 9/1995 | Bajorek et al. | |
| 5,481,733 A | 1/1996 | Douglis et al. | |
| 5,682,273 A | 10/1997 | Hetzler | |
| 5,905,901 A * | 5/1999 | Klein | 395/750.06 |
| 5,913,067 A * | 6/1999 | Klein | 395/750.01 |
| 6,892,313 B1 | 5/2005 | Codilian et al. | |
| 2004/0260957 A1 | 12/2004 | Jeddeloh et al. | |

OTHER PUBLICATIONS

U.S. Appl. No. 11/451,844, filed Jun. 13, 2006, entitled "Adaptive Power Management of a Disk Drive Based on Temperature," Inventor: Mark E. Schutte.
U.S. Appl. No. 11/451,844, filed Jun. 13, 2006, Mark E. Schutte, entitled "Adaptive Power Management of a Disk Drive Based on Temperature".

* cited by examiner

*Primary Examiner*—Nitin C Patel
(74) *Attorney, Agent, or Firm*—Merchant & Gould

(57) ABSTRACT

Systems and methods are provided for updating a temperature table for a disk subsystem in a client system using information provided by a server system. In one embodiment, among others, the client receives an update command from the server system. The update command comprises instructions to update the temperature table. The client updates the temperature table in the disk subsystem in accordance with the update command. The client selects one of the write current values in the temperature table based on a disk subsystem temperature, and writes data to the disk subsystem using the selected write current values.

12 Claims, 12 Drawing Sheets

ADAPTIVE POWER MANAGEMENT OF A DISK DRIVE BASED ON USER ACTIVITY

CROSS REFERENCE TO RELATED APPLICATIONS

This application is related to co-pending U.S. patent application entitled "Adaptive Power Management of a Disk Drive Based On Temperature", having Ser. No. 11/451,844 and filed on the same day as and with identical inventorship as the present application.

FIELD OF THE DISCLOSURE

The present disclosure relates to disk drive disk subsystems, and more specifically, to systems and methods for power management of disk drive disk subsystems.

BACKGROUND

A digital video recorder (DVR) allows a user to record multimedia programming (e.g., video, audio, video and audio) to a recordable medium, and to play back the recorded programs. The recordable medium in a DVR is typically a disk drive (also known as a "hard disk", "hard drive", or "hard disk drive"). After a long period of use, wear and tear on the moving parts within a disk drive will eventually cause the drive to fail. Two predictors of time-to-failure are the total number of hours a disk drive has been in use and the drive temperature. Thus, a drive in use 8 hours a day can be expected to last significantly longer than a drive in use 16 hours a day. A drive operating at 40° C. can be expected to have a longer life than one operating at 50° C.

A DVR typically has two recording behaviors or modes, which in some models can be simultaneous. One mode is selective: programs are selected or scheduled for recording, either by the user or by software in the DVR. The second mode is "record live television", which continuously records to a circular buffer whenever no scheduled program that might use similar resources is recording. The "record live television" feature allows a user to rewind or pause the live programming, without having set up a scheduled recording ahead of time.

The effect of the "record live television" feature is that as long as the DVR is powered on, the disk drive is in use. Furthermore, many users keep a DVR powered on even when the television is powered off. With typical usage patterns, a DVR disk drive can be in use 24 hours a day, 7 days a week. These circumstances combine to reduce the life span of a disk drive in a DVR.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Selected embodiments disclosed herein adaptively power down a DVR disk drive. User interaction with the DVR is monitored, and the disk drive may be placed into a reduced power state if no user activity has been detected after an "inactivity" period. The inactivity period starts with a default value, but is adjusted in an adaptive manner based on operating conditions. In one embodiment, the inactivity period is reduced when the disk drive temperature increases. Another embodiment determines particular time periods having an increased probability of user interaction, and increases the inactivity period during these times, or conversely, decreases the inactivity period during times of decreased probability. In one embodiment, the disk drive stops spinning while in the reduced power state, but power to the drive interface remains. In another embodiment, power to the drive interface is reduced while in the reduced power state.

Figure 1:
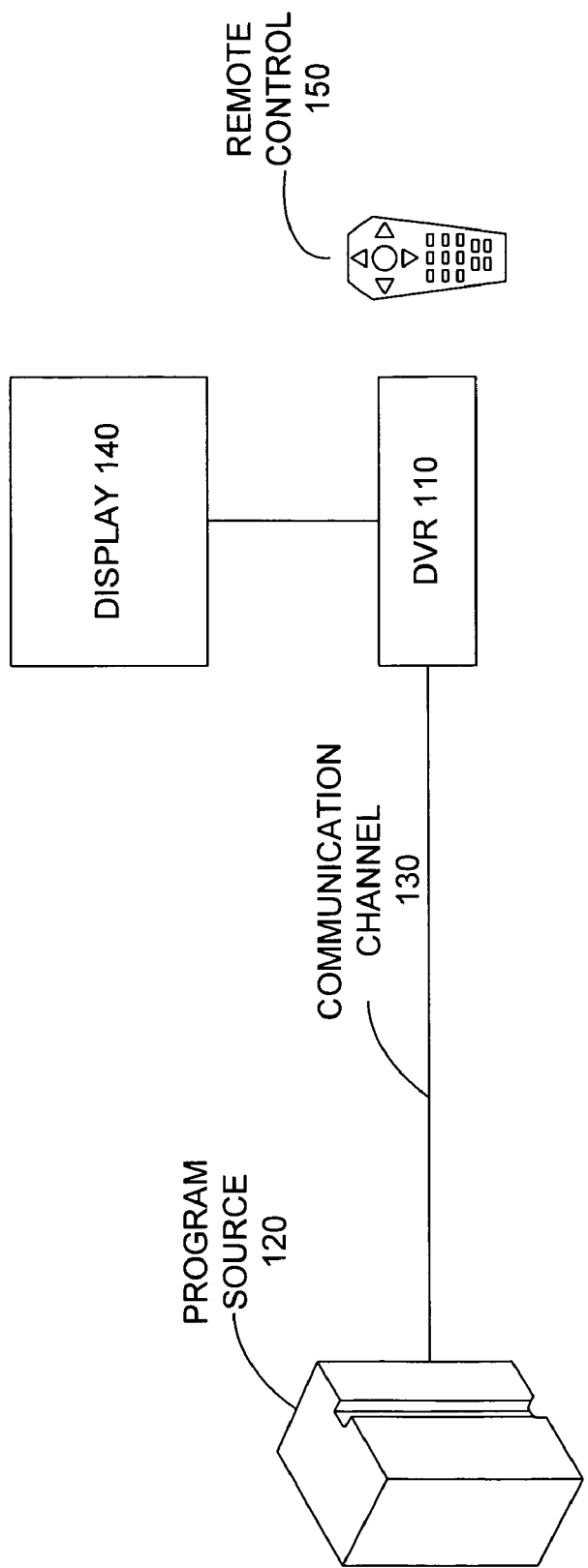
FIG. 1 is a block diagram of the environment in which an embodiment of the systems and methods for adaptive power management of a disk drive is located.

FIG. 1 is a block diagram of the environment in which an embodiment of the systems and methods for adaptive power management of a disk drive is located. A digital video recorder (DVR) 110 can record video programming that is received from a program source 120 over a communication channel 130. In one embodiment, program source 120 is a cable television headend, but other delivery mechanisms are also contemplated, for example, satellite, over-the-air broadcasts received by an antenna, and Internet Protocol (IP) data networks. DVR 110 can also play back a recorded video program for viewing on a display 140. A user can program DVR 110 through an input device, such as a remote control 150, or front panel buttons (not shown).

Figure 2:
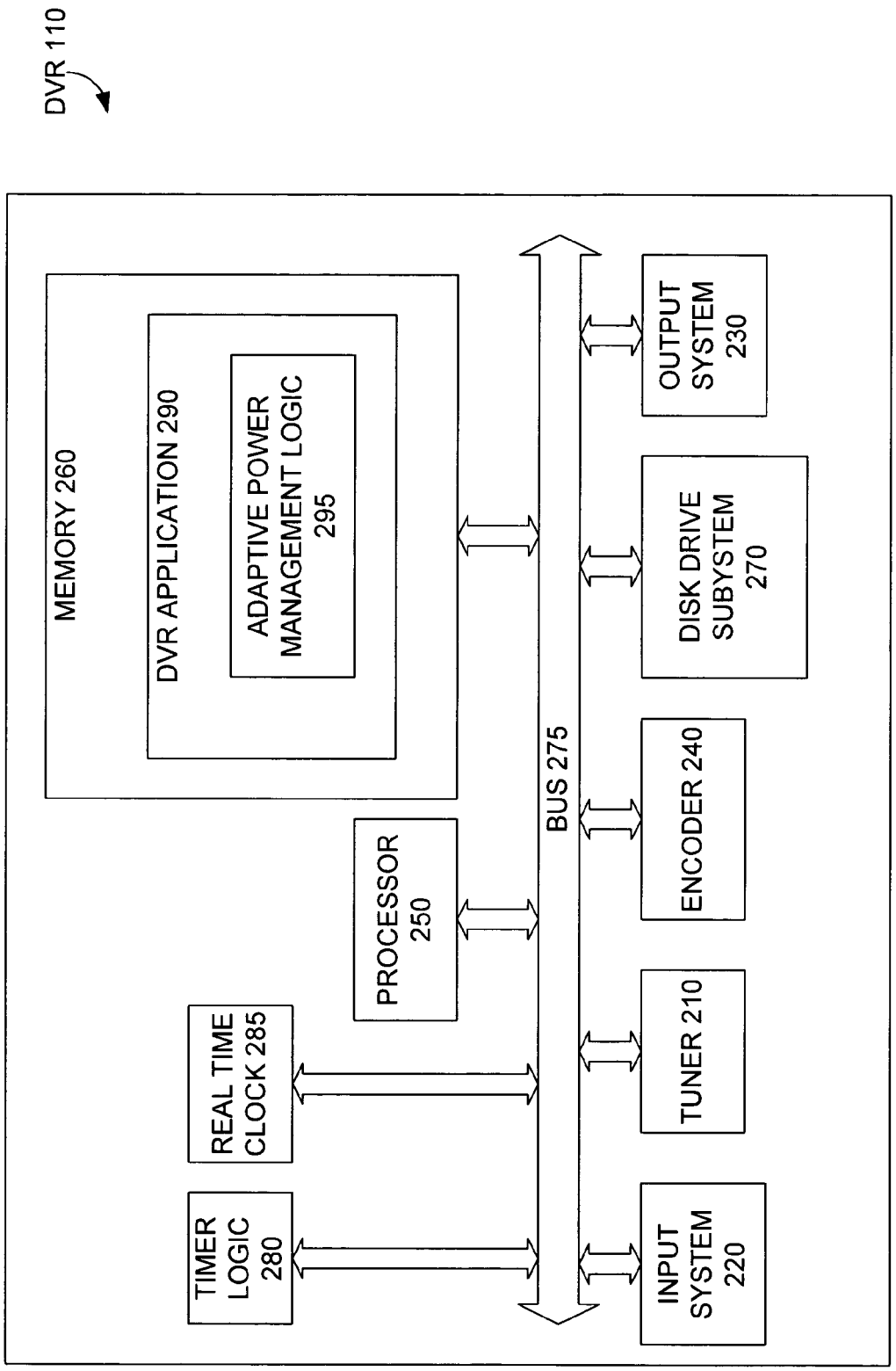
FIG. 2 is a block diagram showing selected components of the DVR of FIG. 1.

FIG. 2 is a block diagram showing selected components of the DVR 110 from FIG. 1. DVR 110 comprises: a network interface 210; an input system 220; an output system 230; an encoder 240; a processor 250; memory 260; and a recordable medium subsystem 270. These components are coupled by a bus 275. Network interface 210 receives video programming from program source 120 (FIG. 1). Input system 220 receives user inputs from remote control 150 (FIG. 1), from buttons located on the exterior of the DVR 110, from a keyboard, or from another input device. Output system 230 drives a display device such as a computer monitor or a television.

In some embodiments, video programs are digitally encoded before being stored on recordable medium 270 by DVR application 290. In the example DVR 110 of FIG. 2, digital encoding is performed by an encoder 240. In another embodiment, the program is digitally encoded by program source 120, and so encoding by the DVR 110 is unnecessary.

DVR 110 also includes programmable timer logic 280, which in some embodiments may be configured to interrupt processor 250 when a pre-programmed interval has expired. In other embodiments processor 250 may poll timer logic 280 to determine an elapsed tick count, from which processor 250 may determine if an interval has passed. Some embodiments of DVR 110 include a real time clock 285 which provides current time/date. Some embodiments of real time clock 285 are also programmable to interrupt processor 250 at a specific time/date.

Memory 260 contains instructions that are executed by processor 250 to control operations of DVR 110. Residing in memory 260 is DVR application 290, which includes adaptive power management logic 295. Omitted from FIG. 2 are a number of conventional components, known to those skilled in the art, that are unnecessary to explain the operation of the systems and methods for adaptive power management of a disk drive disclosed herein.

Figure 3:
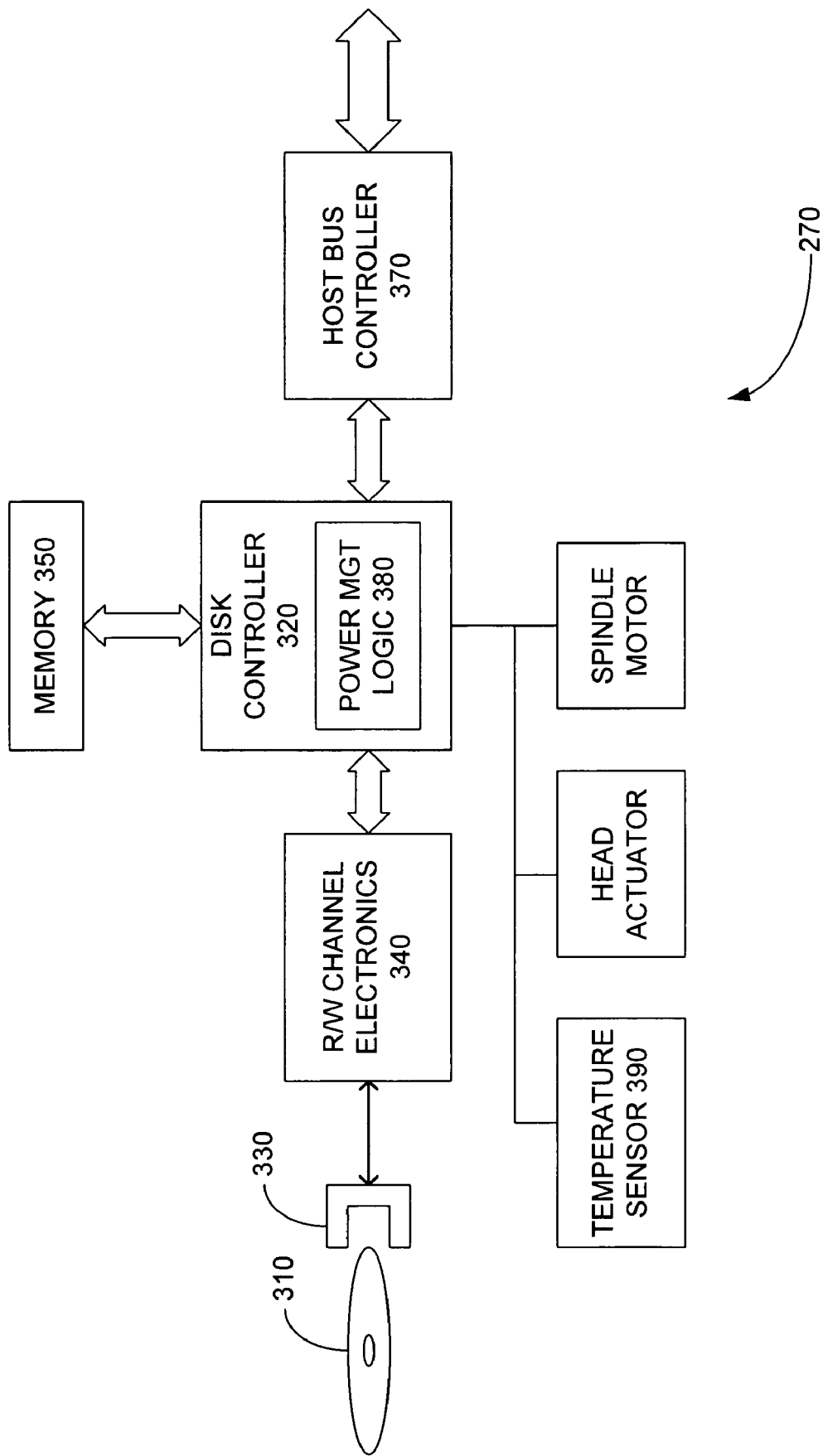
FIG. 3 is a hardware block diagram of one embodiment of the recordable medium subsystem of FIG. 2.

FIG. 3 is a hardware block diagram of one embodiment of recordable medium subsystem 270, in which medium 270 is a disk drive. Data is stored in magnetic form on a platter 310 which rotates on a spindle (not shown) at a constant rate. A disk controller 320 precisely positions a head 330 over the spinning platter 310, and read/write channel electronics 340 reads or writes data at this position by either detecting current in, or supplying current to, head 330. Once read, data bits are stored in buffers in memory 350, which is locally accessible to disk controller 320.

Data is communicated between disk drive subsystem 270 and host processor 250 (FIG. 2) via a host bus 360. A host bus controller 370 is responsible for transferring data to be recorded into a portion of memory 350, and for transferring data read by the read/write channel 340 into a portion of memory 350.

Power management logic 380 allows the power usage of disk drive subsystem 270 to be controlled and monitored by host processor 250, using power states. Various embodiments of Power management logic 380 may support different power states, including, for example: Idle or Spin-down power state, in which the disk drive stops spinning but power to other drive electronics remains; and Standby power state, in which power to most drive electronics is removed.

As DVR 110 operates, components heat up and the temperature inside disk drive subsystem 270 typically rises. Read and write operations in the hard disk are affected by temperature. High temperatures can lead to data errors, and can also reduce the time-to-failure for the drive. Some embodiments of disk drive subsystem 270 include a temperature sensor 390 which measures the ambient temperature inside the subsystem. Temperature sensor 390 can take many different forms, including but not limited to a semiconductor sensor and a thermistor. In some embodiments, temperature sensor 390 is used by power management logic 380.

Adaptive power management logic 295 is abstracted herein as a collection of software components, each of which includes data and code to manipulate the data. These components may also be referred to as objects, modules, functions, or other terms familiar to one of ordinary skill in the art. Adaptive power down logic 295 is described below in terms of components (code and data), rather than with reference to a particular hardware device executing that code, such as the DVR 110 of FIG. 2. One of ordinary skill in the art should understand that adaptive power management logic 295 can be implemented in any programming language, and executed on a variety of computing platforms. Furthermore, one or more portions of adaptive power management logic 295 can be implemented in hardware rather than software, for example, by a gate array or an integrated circuit.

Figure 4:
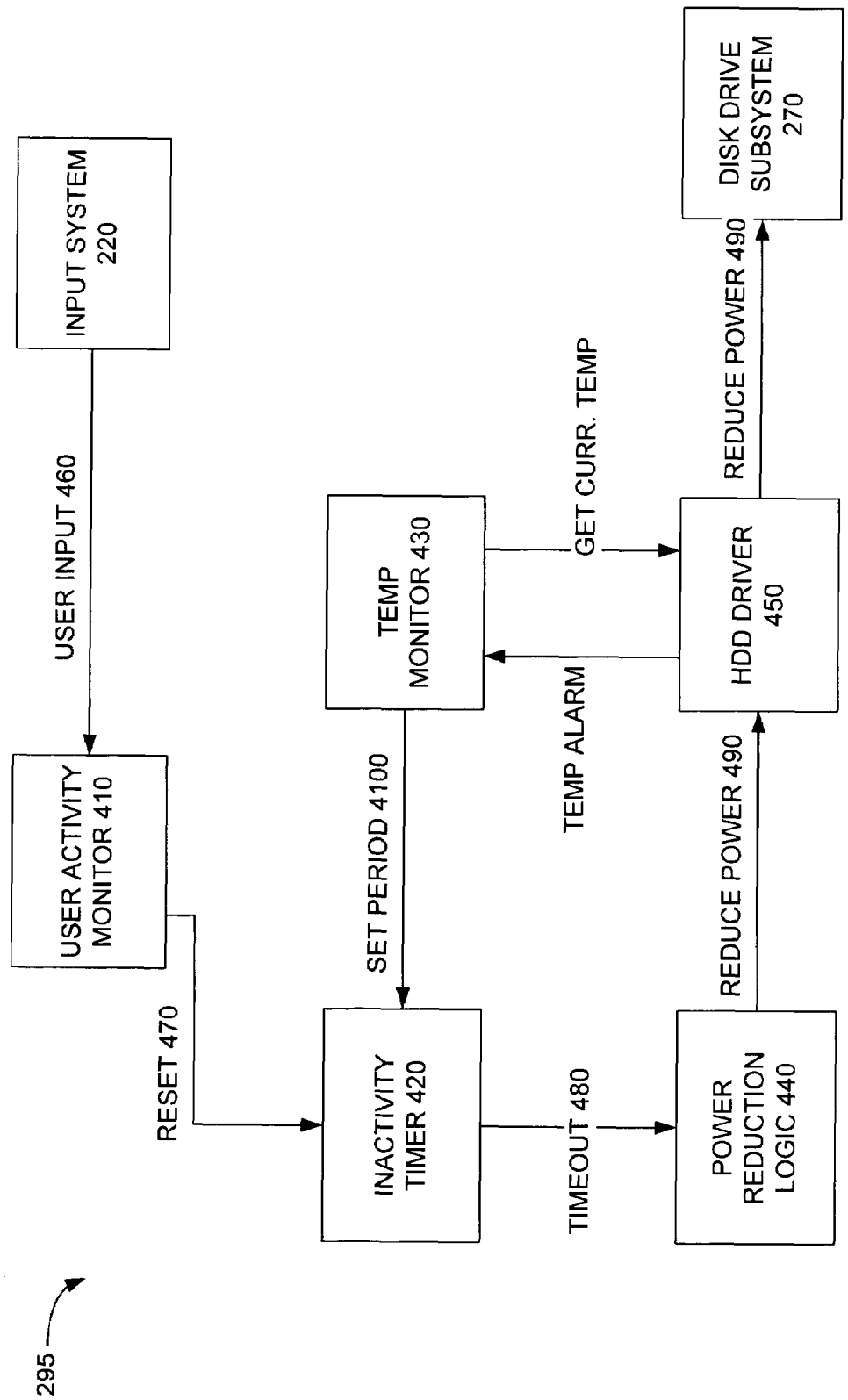
FIG. 4 is a data flow diagram in accordance with one embodiment of the adaptive power management logic of FIG. 2.

FIG. 4 is a data flow diagram in accordance with one embodiment of adaptive power management logic 295, showing the flow of data, events, and/or messages between the software components. In the embodiment of FIG. 4, the adaptation is based on disk drive temperature: power to the drive is reduced after a period of user inactivity, and increased drive temperature reduces the inactivity timeout. In this embodiment, logic 295 includes: user activity monitor 410; user inactivity timer 420; temperature monitor 430; power reduction logic 440; and disk drive device driver 450.

User activity monitor 410 receives indications of user activity (460), such as button or key input, from DVR input system 220. User activity monitor 410 resets (470) user inactivity timer 420 as a result of user activity 460. In some embodiments, each input 460 resets user inactivity timer 420. In other embodiments, user inactivity timer 420 is reset after multiple inputs 460.

When user inactivity timer 420 times out, or expires, power reduction logic 440 receives an indication (480). In response, power reduction logic 440 may send a reduce power command (490) to disk drive subsystem 270. (Power reduction logic 440 is discussed in more detail in connection with FIG. 6). In the embodiment of FIG. 4, power reduction logic 440 interfaces with disk drive subsystem 270 through device driver 450. In other embodiments, intermediate device driver 450 is not present. Note that user inactivity timer 420 relates to user input activity for the DVR 110, rather than read/write activity of disk drive subsystem 270. As discussed earlier, the disk drive itself may have few periods of inactivity because DVR 110 is typically continuously recording to a circular buffer.

Temperature monitor 430 sets (4100) the period of user inactivity timer 420 based on the temperature in disk drive subsystem 270. In one embodiment, when this temperature reaches a threshold, temperature monitor 430 reduces the period of user inactivity timer 420, for example, reducing the current period by half. Embodiments that use more than one temperature threshold, and reduce the inactivity timer period at each threshold, are also contemplated.

In one embodiment, temperature monitor 430 queries disk drive subsystem 270 (through device driver 450) for the current temperature and compares this temperature to a threshold maintained by temperature monitor 430. In another embodiment, disk drive subsystem 270 (through device driver 450) notifies temperature monitor 430 when the current temperature reaches a threshold. This feature may be referred to a temperature alarm. In one embodiment, the alarm threshold is maintained by disk drive subsystem 270, but may be programmed by temperature monitor 430.

Figure 5A:
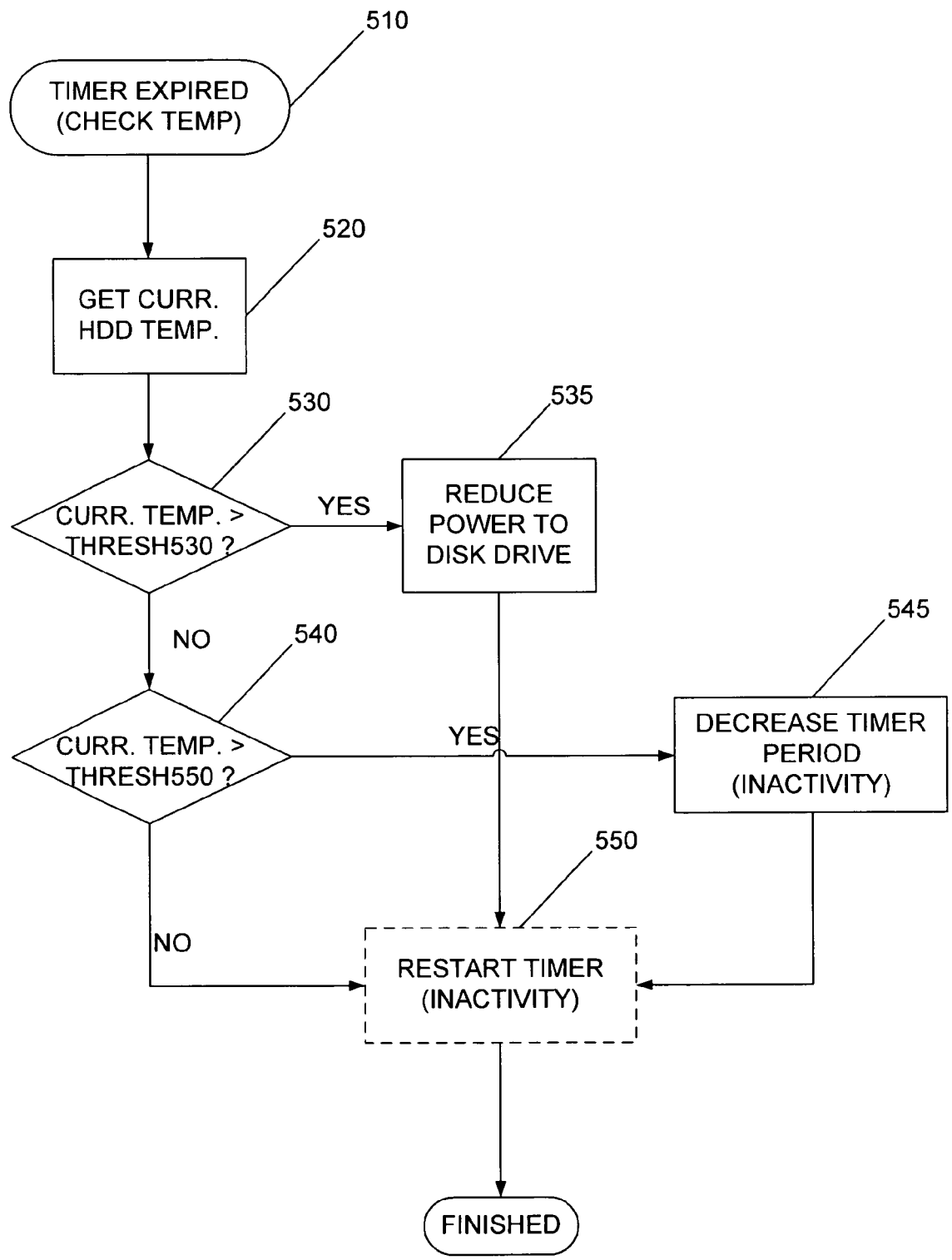
FIG. 5A is a flow chart of one embodiment of the temperature monitor of FIG. 4.

FIG. 5A is a flow chart of one embodiment of temperature monitor 430. In this embodiment, temperature monitor 430 uses a timer to periodically query the disk drive subsystem 270 for the drive temperature. This embodiment uses two different temperature thresholds, where drive temperature above the higher threshold results in immediate drive power reduction, and drive temperature above the lower threshold results in a reduced timeout for user inactivity timer 420. Other embodiments use a greater or lesser number of temperature thresholds and associated timeouts.

Processing starts at block 510, when a check temperature timer expires. Next (block 520), the drive temperature is obtained, and the compared (block 530) with a first pre-defined threshold. If the current drive temperature exceeds this first threshold, processing continues at block 535, where temperature monitor 430 attempts to reduce power to the disk drive. (The power reduction process is discussed in more detail in connection with FIG. 6).

If the current drive temperature does not exceed the first predefined threshold, then this temperature is compared (block 540) to a second predefined threshold. If the temperature does not exceed the second threshold, then the check temperature processing is finished. If the temperature does exceed the second threshold, processing continues at block 545, where the period of user inactivity timer 420 is reduced. Before the check temperature processing in FIG. 5A completes, temperature monitor 430 may optionally restart user inactivity timer 420 (block 550).

Figure 5B:
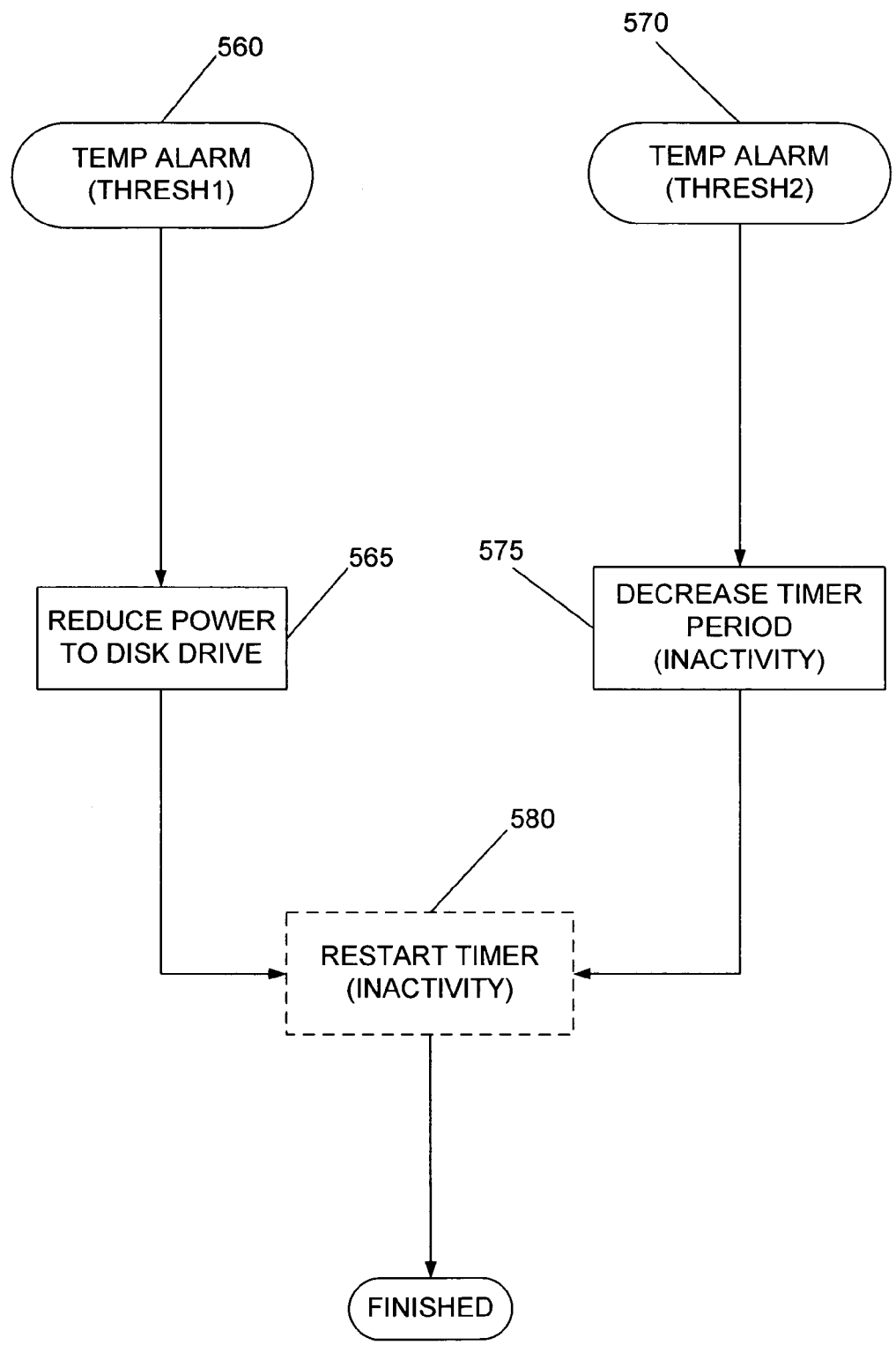
FIG. 5B is a flowchart of another embodiment of the temperature monitor of FIG. 4.

FIG. 5B is a flowchart of another embodiment of temperature monitor 430. In this embodiment, disk drive subsystem 270 notifies temperature monitor 430 when drive temperature has exceeded either of two thresholds. In this embodiment, as in the polled embodiment of FIG. 5, drive temperature above the higher threshold results in immediate power reduction, and drive temperature above the lower threshold results in a reduced timeout for user inactivity timer 420. One embodiment of disk drive subsystem 270 supports programmable thresholds.

Processing starts at either block 560, when the first threshold is exceeded, or block 570, when the second threshold is exceeded. From entry point 560, processing proceeds to block 565, where temperature monitor 430 attempts to reduce power to the disk drive. From entry point 570, processing proceeds to block 575, where the period of user inactivity timer 420 is reduced. Before the check temperature processing in FIG. 5B competes, temperature monitor 430 may optionally restart user inactivity timer 420 (block 580).

Figure 6:
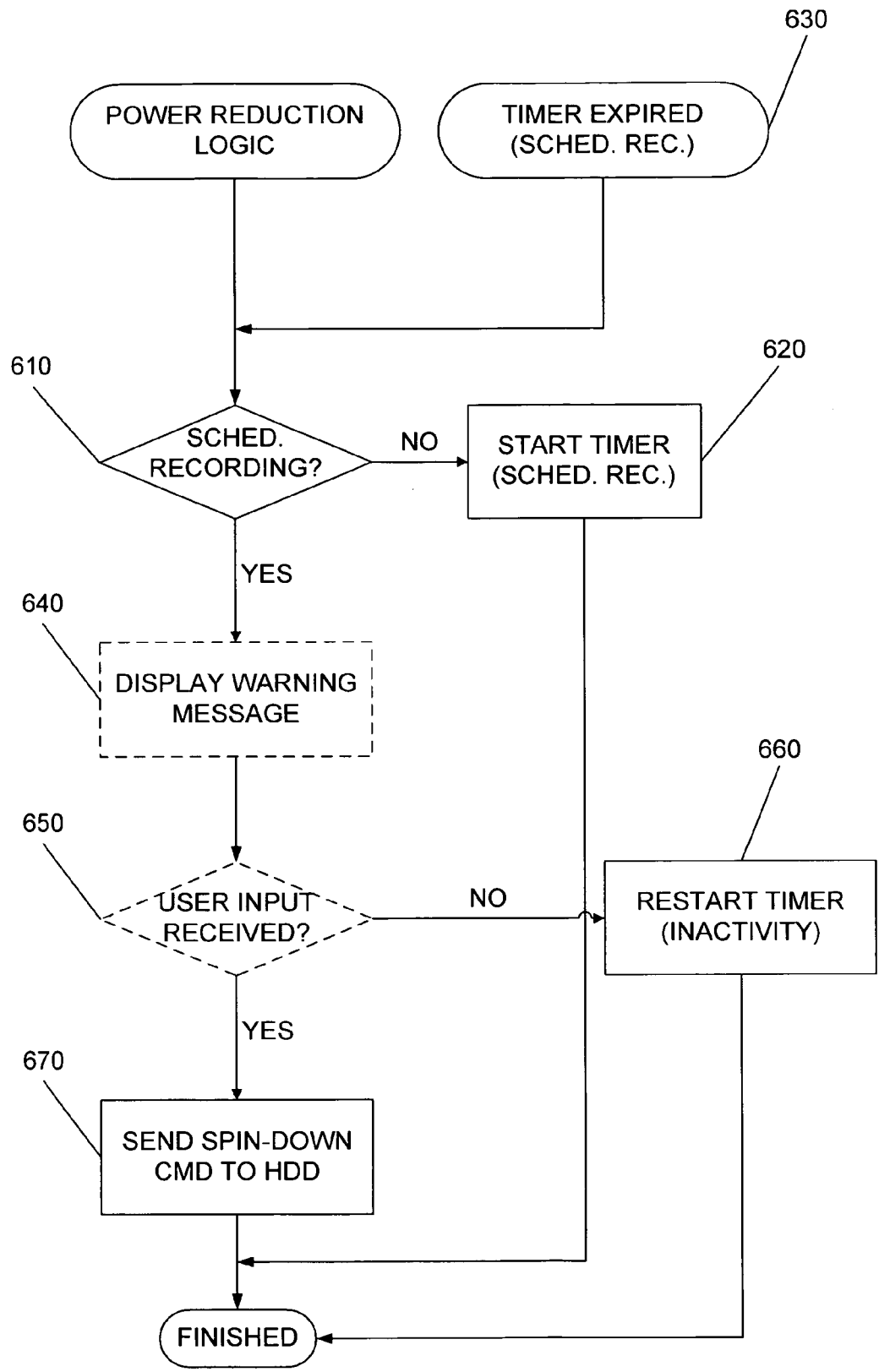
FIG. 6 is a flow chart of one embodiment of the power reduction process of FIG. 5.

FIG. 6 is a flow chart of one embodiment of the power reduction process 535 in FIG. 5. At block 610, power reduction logic 440 determines whether a scheduled recording is currently in progress. If Yes, then at block 620 a timer is started so that the same check can be performed again after a delay, and processing is finished. When this "check for scheduled recording in progress" timer expires, then the power reduction process will be entered again at block 630.

If no scheduled recording is in progress, processing continues at block 640, where a message may be displayed to warn the user that the disk drive will be powered down. Next (block 650), the power reduction process 535 checks the DVR input system 220 to determine whether the user has entered input in response to the warning message. In one embodiment, if any input has been received, then user inactivity timer 420 is restarted (block 660, and the drive is not powered down. In other embodiments, the restart of user inactivity timer 420 occurs only when a specific input (e.g., a "select" button) has been received. If no input has been received, then in one embodiment a spin down command is issued to disk drive subsystem 270 at block 670, and in another embodiment, a power down command is issued to disk drive subsystem 270. Displaying a message to the user and receiving user input (blocks 640 and 650) are optional, and so may not be found in all embodiments.

Figure 7:
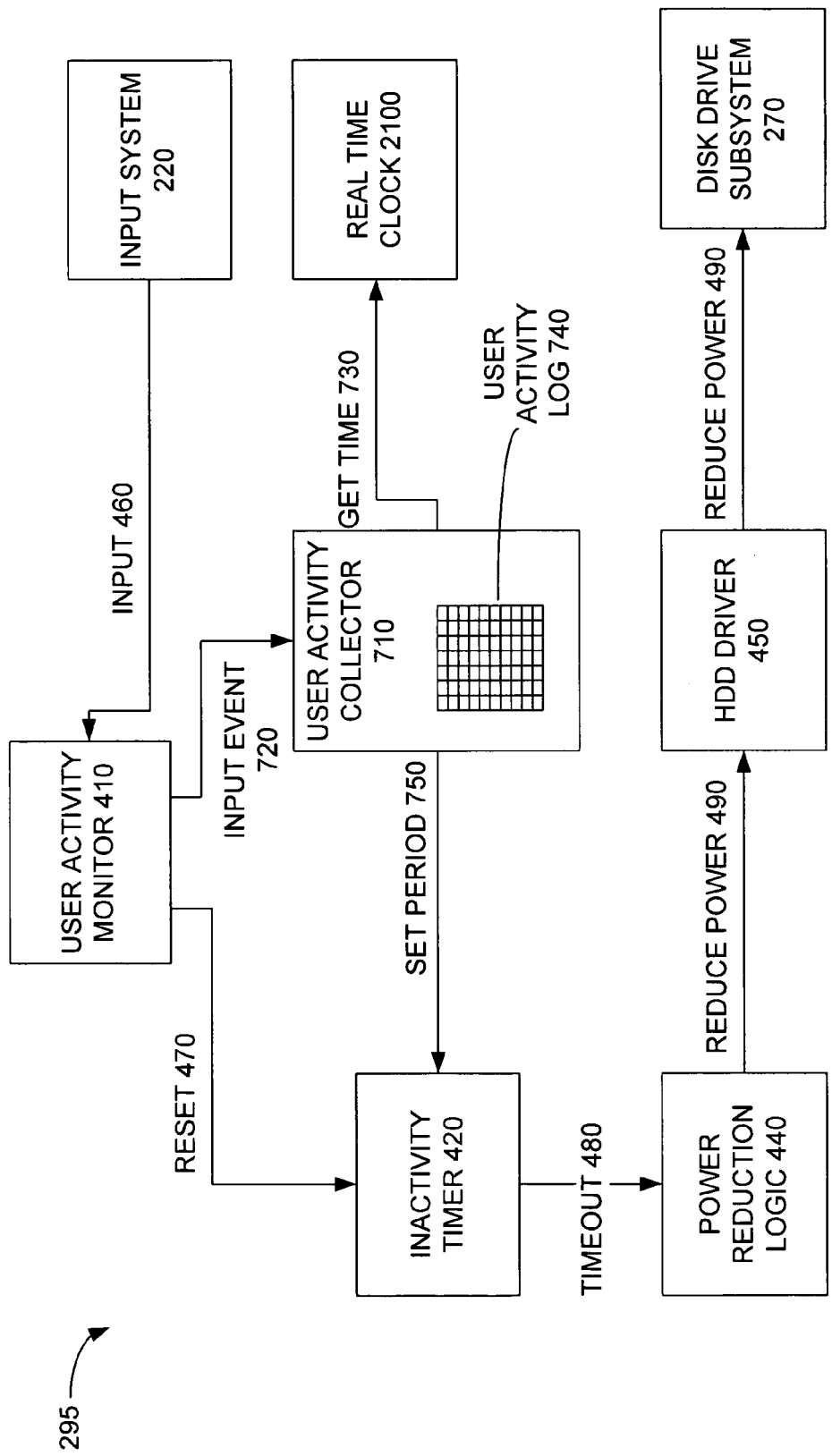
FIG. 7 is a data flow diagram of another embodiment of the adaptive power management logic of FIG. 2.

FIG. 7 is a data flow diagram of another embodiment of adaptive power management logic 295, in which the adaptation is based on a history of user activity: power to the drive is reduced after a period of user inactivity, and the inactivity timeout is adjusted based on past user activity. In this embodiment, logic 295 includes: user activity monitor 410; user inactivity timer 420; power reduction logic 440; disk device driver 450; and user activity collector 710.

User activity monitor 410 receives indications of user activity (460), such as button or key input, from DVR input system 220. Based on user activity 460, user activity monitor 410 resets (470) user inactivity timer 420. In some embodiments, user inactivity timer 420 is reset with each user input 460. In other embodiments, user inactivity timer 420 is reset after multiple inputs 460.

When user inactivity timer 420 times out, or expires, power reduction logic 440 receives an indication (480). In response, power reduction logic 440 may send a reduce power command (490) to disk drive subsystem 270. In the embodiment of FIG. 4, power reduction logic 440 interfaces with disk drive subsystem 270 through device driver 450. In other embodiments, intermediate device driver 450 is not present.

User activity collector 710 is notified of user activity through events 720, and determines the time slot in which each user activity occurs using services (730) provided by real time clock 285. User activity collector 710 maintains a log (740) of activity during each time slot. Because users typically have regular television viewing patterns, these past user interactions with DVR 110 during particular time slots are used by user activity collector 710 as a predictor of future user interactions. For example, if user activity log 740 indicates that a user has interacted with DVR 110 every weekday between 3:00 and 3:35 PM, and today is a weekday, then it is likely that a user will interact with DVR 110 today during the same time slot.

Based on a positive or negative indication of future user activity, user activity collector 710 dynamically adjusts (750) the period of user inactivity timer 420. During times of the day when user activity log 740 indicates that user interaction is less likely to occur (i.e., a negative indication), the timeout for user inactivity timer 420 is relatively short. In this case, power reduction of disk drive subsystem 270 occurs after a relatively short period of user inactivity. During times of the day when user activity log 740 indicates that some user interaction is more likely to occur (i.e., a positive indication), the timeout is relatively long, and power reduction occurs after a relatively long period of user inactivity.

One of ordinary skill in the art should realize that the same result can be realized with different mechanisms, for example: increasing the inactivity timeout, from a relatively short default value, when user activity log 740 indicates user interaction is likely; reducing the inactivity timeout, from a relatively long default value, when user activity log 740 indicates user interaction is unlikely.

Figure 8:
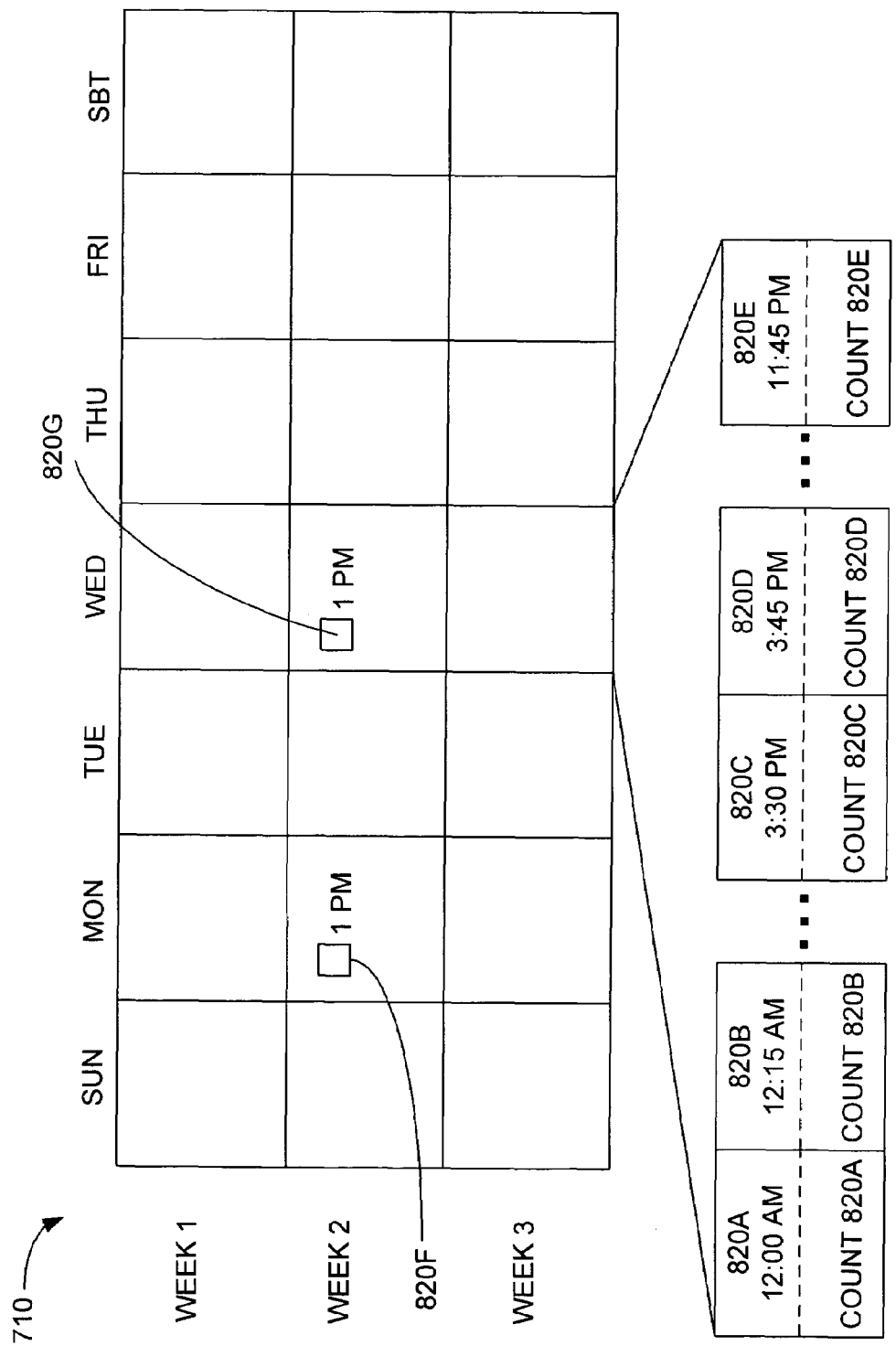
FIG. 8 is a block diagram of one embodiment of the user activity log of FIG. 7.

FIG. 8 is a block diagram of one embodiment of the user activity log 740 of FIG. 7. User activity log 740 has a particular duration, which in this example is 3 weeks. user activity log 740 is also divided into time slots (810), which in this example are each 15 minutes long: 810A spans 12:00 AM to 12:15 AM; 810B spans 12:15 AM to 12:30 AM; 810C spans 3:30 PM to 3:45 PM; 810D spans 3:45 PM to 4:00 PM; and 810E spans 11:45 PM to 12:00 AM. In another embodiment, time slots 810 may have different lengths. For example, if less user activity is expected in the late night and early morning, time slots may be 30 minutes between midnight and 6 AM and 15 minutes for the remainder of the day.

In the example embodiment of FIG. 8, the time slots 810 are organized into days of the week, which allows user activity to be tracked by time-of-day/day-of-week. Time slots 810 can also be organized in other ways, for example: weekdays and weekends; day of the month; time-of-day only.

User activity log 740 maintains user activity counters 820 for time slots 810 in user activity log 740. A counter 820 may track user activity for one or more time slots 810, depending on how user activity log 740 is organized. In the example embodiment of FIG. 8, time slots 810 are organized into days of the week, so a particular counter 820 corresponds to a specific day of the week as well as to a time of the day: counter 820C corresponds to Monday 1:00-1:45 PM; counter 820F corresponds to Wednesday 1:00-1:45 PM. The user activity log 740 in FIG. 8 includes 3 weeks of 15-minute time slots, and thus has 2016 counters (not all shown).

Other embodiments are contemplated for other organizations of user activity log 740. For example, in another embodiment, activity at 3:30 PM on January 1 is maintained by a "3:30 PM —$1^{st}$ day of the month" counter. In yet another embodiment, user activity log 740, activity at 3:30 PM on January 1 is tracked by a "3:30 PM—Jan. 1" counter. The variations described above can be combined by having multiple sets of counters (e.g., activity at 3:30 PM on Tuesday January 1 is counted by a "3:30 PM—Tuesday" counter and by a "3:30 PM —$1^{st}$ day of the month" counter).

Figure 9A:
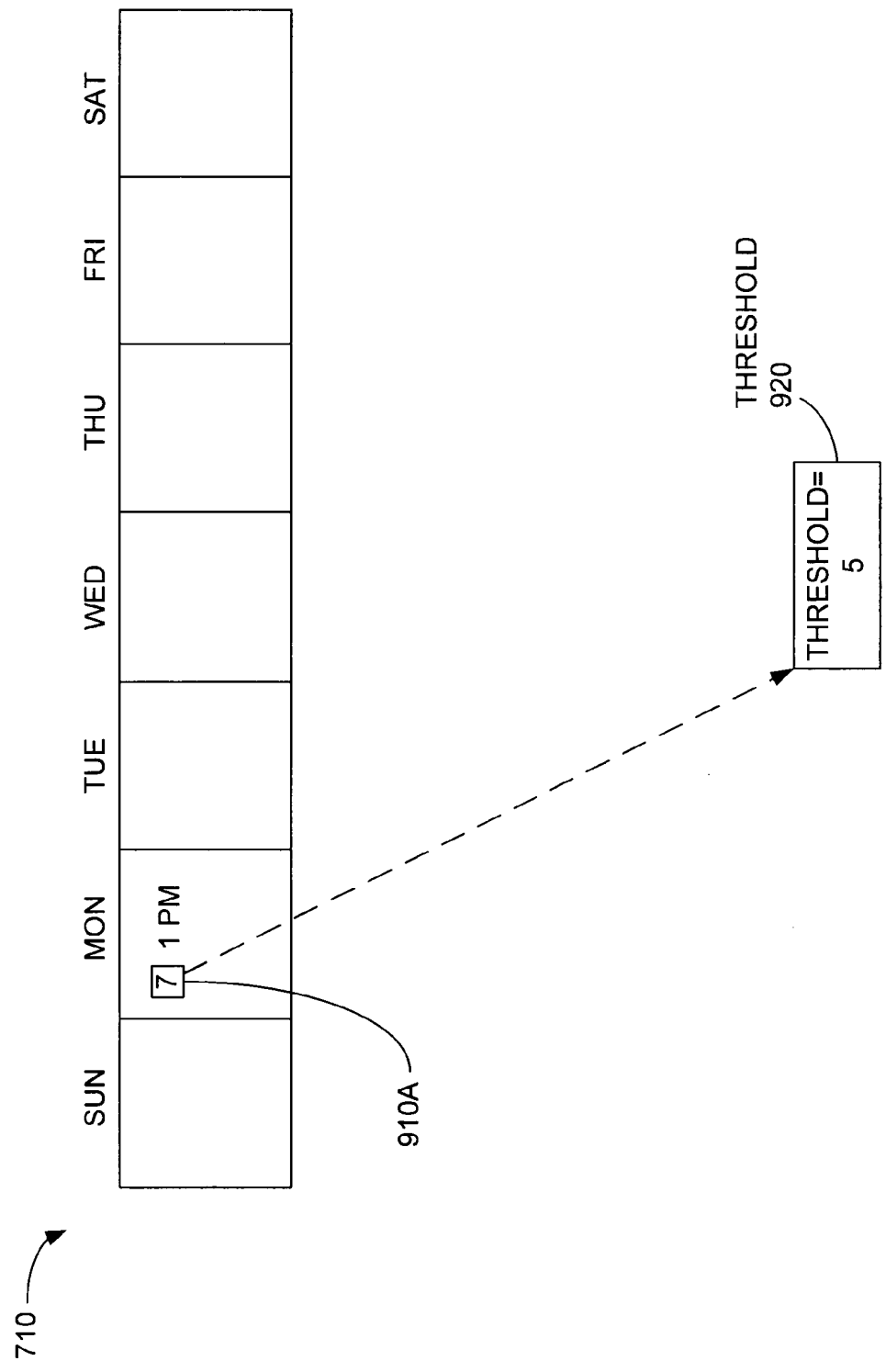
FIGS. 9A-C illustrate three examples of how indications of user activity are determined from the user activity log of FIG. 7.
Figure 9B:
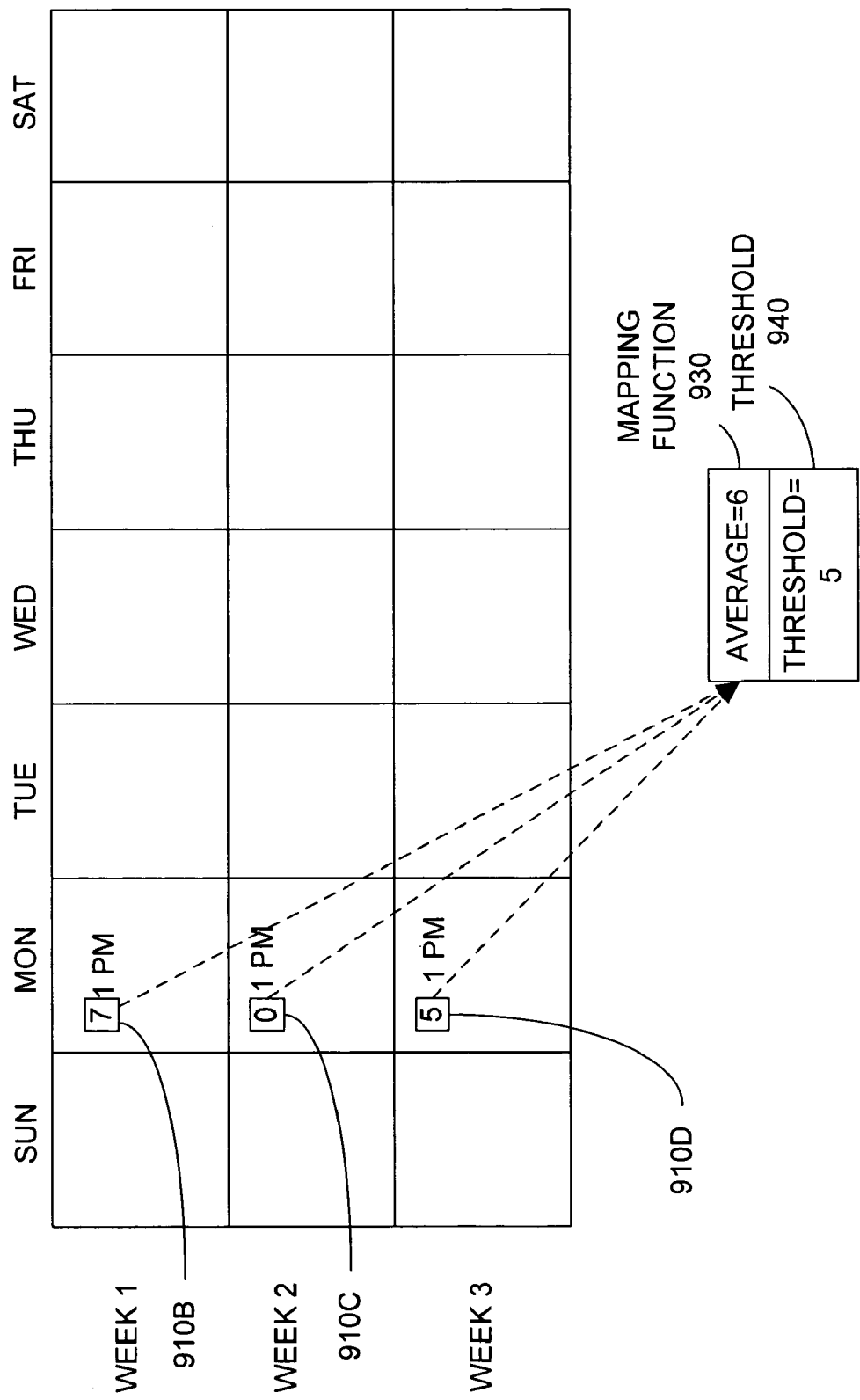
Figure 9C:
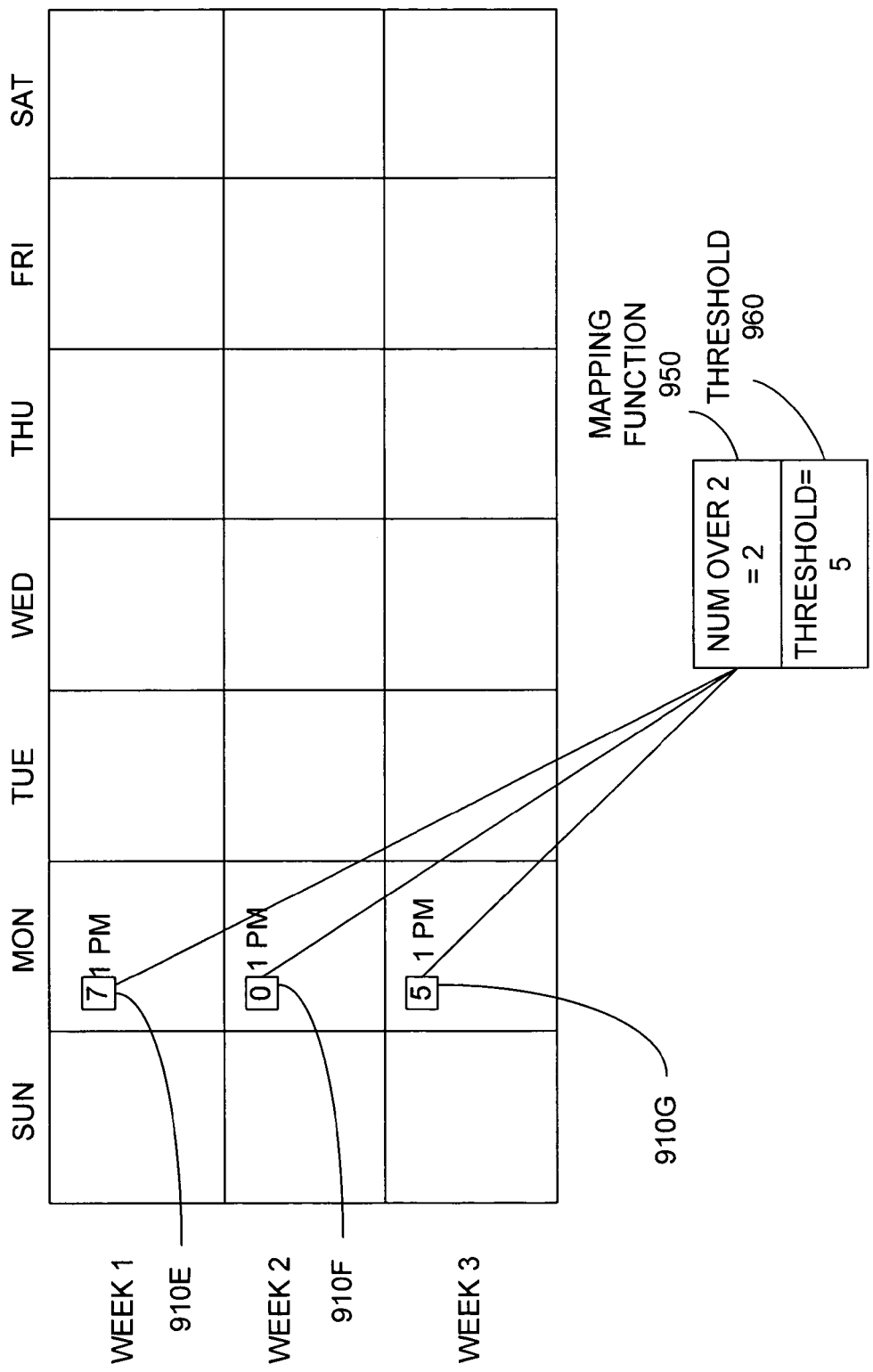

FIGS. 9A-C illustrate three examples of how indications of user activity are determined from user activity log 740. In the example of FIG. 9A, user activity log 740 is organized into days of the week, and counters 910 track activity by time-of-day-day-of-week. For example, counter 910A tracks the 1 PM Monday time slot. In this embodiment, a counter 910 for a time slot is compared to a threshold 920, and a value over the threshold positively indicates a future user activity in that time slot. Thus, each counter 910 corresponds directly to an indication (positive or negative) of user activity.

In contrast, in the examples of FIGS. 9B and 9C, user activity log 740 maintains multiple counters for a time slot. Here a set of counters is transformed, or mapped, to an indication of user activity. In FIG. 9B, user activity log 740 maintains 3 counters (910B-D), one for each 1 PM Monday time slot. Mapping function 930 determines an average for all 3 counters, and the resulting average is compared to a threshold 940. A value over the threshold indicates a prediction of user activity in the time slot.

User activity log 740 in FIG. 9C also maintains 3 counters (910E-G), one for each 1 PM Monday time slot. However, a different mapping function 950 is used, in which the number of counters that exceeds a minimum is totaled, and compared to a threshold 960. In this example, the alternative mapping results in a value of 2. The mapping function of FIG. 9C may be preferable under some conditions, since when an average or mean is used a single high value can skew the result.

The embodiments of user activity log 740 described above are merely examples. The system designer may choose the mapping function, threshold values, time slot size, number of time slots, and number of counter sets, based on an empirical determination of what patterns of user activity provide reliable indications.

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

The systems and methods disclosed herein can be implemented in software, hardware, or a combination thereof. In some embodiments, the system and/or method is implemented in software that is stored in a memory and that is executed by a suitable microprocessor situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

In alternative embodiments, the systems and/or methods disclosed here are implemented in hardware, including but not limited to: a discrete logic circuit(s) having logic gates for implementing logic functions upon data signals; an application specific integrated circuit (ASIC) having appropriate combinatorial logic gates; a programmable gate array(s) (PGA); a field programmable gate array (FPGA), etc.

The foregoing description has been presented for purposes of illustration and description. It is not intended to be exhaustive or to limit the disclosure to the precise forms disclosed. Obvious modifications or variations are possible in light of the above teachings. The embodiments discussed, however, were chosen and described to illustrate the principles of the disclosure and its practical application to thereby enable one of ordinary skill in the art to utilize the disclosure in various embodiments and with various modifications as are suited to the particular use contemplated. All such modifications and variation are within the scope of the disclosure as determined by the appended claims when interpreted in accordance with the breadth to which they are fairly and legally entitled.

What I claim is:

1. A method for adaptively managing power usage of a disk drive in a device, the method comprising the steps of:
   monitoring current user activity with the device;
   reducing power to the disk drive after a predetermined period of user inactivity;
   maintaining a user activity log of past user activity events, wherein the log comprises a plurality of time slots, each time slot associated with a time of day at which one of the past user activity events occurred, and the log comprises a plurality of counters associated with each time slot;
   using, for each time slot, the associated plurality of counters to track the number of past user activity events that occurred during the time slot;

mapping, for each time slot, an indication of future user activity in the user activity log, based on the values of the plurality of counters associated with the time slot; and adjusting the predetermined period of user inactivity based on the indication in the user activity log of future user activity.

2. The method of claim 1, wherein the indication is a negative indication and further comprising the step of decreasing the predetermined period responsive to the negative indication.

3. The method of claim 1, wherein the indication is a positive indication and further comprising the step of increasing the predetermined period responsive to the negative indication.

4. The method of claim 1, wherein each time slot is further associated with a day of week at which the one of the user activity events occurred.

5. The method of claim 1, wherein the adjusting step occurs at a current time, wherein the current time corresponds to at least one of the time slots, and wherein the indication results from comparing an average value of the counters associated with the time slot to a threshold to produce a positive indication if the average value meets or exceeds the threshold.

6. The method of claim 1, wherein the adjusting step occurs at a current time, wherein the current time corresponds to a plurality of the time slots, and wherein the indication results from mapping the plurality of counters associated with the time slots then comparing the mapping result to a threshold to produce a positive indication if the result meets or exceeds the threshold.

7. An apparatus comprising:
a disk drive;
a user activity monitor configured to receive an indication of user activity from a user input device;
a user inactivity timer configured to expire after a predetermined period of user inactivity;
power reduction logic configured to send a power reduction command to the disk drive in response to expiration of the user inactivity timer; and
a user activity collector configured to:
maintain a user activity log of past user activity events, wherein the log comprises a plurality of time slots, each time slot associated with a time of day at which one of the past user activity events occurred, and the log comprises a plurality of counters associated with each time slot during a day, each of the counters tracking a number of occurrences of user activity events during the time slot;
map, for each time slot, an indication of future user activity in the user activity log, based on the values of the plurality of counters associated with the time slot; and
set the period of the user inactivity timer based on the indication in the user activity log of future user activity.

8. The apparatus of claim 7, wherein the indication comprises a negative indication and the user activity collector is further configured to decrease the predetermined period responsive to the negative indication.

9. The apparatus of claim 7, wherein the indication comprises a positive indication the user activity collector is further configured to increase the predetermined period responsive to the positive indication.

10. The apparatus of claim 7, wherein each time slot is further associated with a day of week at which the one of the user activity events occurred.

11. The apparatus of claim 7, wherein the user activity collector is further configured to:
set the period of the user inactivity period at a current time corresponding to at least one of the time slots; and
wherein the indication results from comparing an average value of the counters associated with the time slot to a threshold to produce a positive indication if the average value meets or exceeds the threshold.

12. The apparatus of claim 7, wherein the user activity collector is further configured to:
set the period of the user inactivity period at a current time corresponding to at least one of the time slots; and
wherein the indication results from mapping the plurality of counters associated with the time slots then comparing the mapping result to a threshold to produce a positive indication if the result meets or exceeds the threshold.

* * * * *